United States Patent [19]

Sakata et al.

[11] Patent Number: 5,053,896
[45] Date of Patent: Oct. 1, 1991

[54] RECEIVING METHOD AND APPARATUS FOR RECORDING RECEIVED DATA ONTO A RECORDING MEDIUM

[75] Inventors: Tsuguhide Sakata, Machida; Tomishige Taguchi, Urawa; Norio Kimura, Shinagawa; Kunio Tsuruno, Tokyo; Masahiro Takei; Yasutomo Suzuki, both of Yokohama, all of Japan

[73] Assignee: Canon Kabushiki Kaisha, Tokyo, Japan

[21] Appl. No.: 456,531

[22] Filed: Dec. 26, 1989

Related U.S. Application Data

[62] Division of Ser. No. 48,840, May 12, 1987, abandoned.

[30] Foreign Application Priority Data

| May 14, 1986 | [JP] | Japan | 61-109894 |
| May 14, 1986 | [JP] | Japan | 61-109895 |
| May 14, 1986 | [JP] | Japan | 61-109896 |
| May 14, 1986 | [JP] | Japan | 61-109897 |

[51] Int. Cl.$^5$ .......................... G11B 5/02; G11B 15/18
[52] U.S. Cl. .................................................... 360/71
[58] Field of Search ..................... 360/5, 69, 71, 73.03

Primary Examiner—Robert S. Tupper
Attorney, Agent, or Firm—Fitzpatrick, Cella, Harper & Scinto

[57] ABSTRACT

There is a receiving apparatus in which the received data is recorded by a recording head which accesses each portion of a recording medium. This receiving apparatus comprises: a discriminating circuit to discriminate whether the portion accessed by the recording head is the recorded portion or the unrecorded portion upon reception; and a control circuit for allowing the recording head to access the unrecorded portion on the basis of the result of the discrimination of the discriminating circuit. Upon reception, the control circuit controls the recording head so as to automatically access the unrecorded portion. Further, upon reception, an amount of unrecorded portions is displayed.

22 Claims, 12 Drawing Sheets

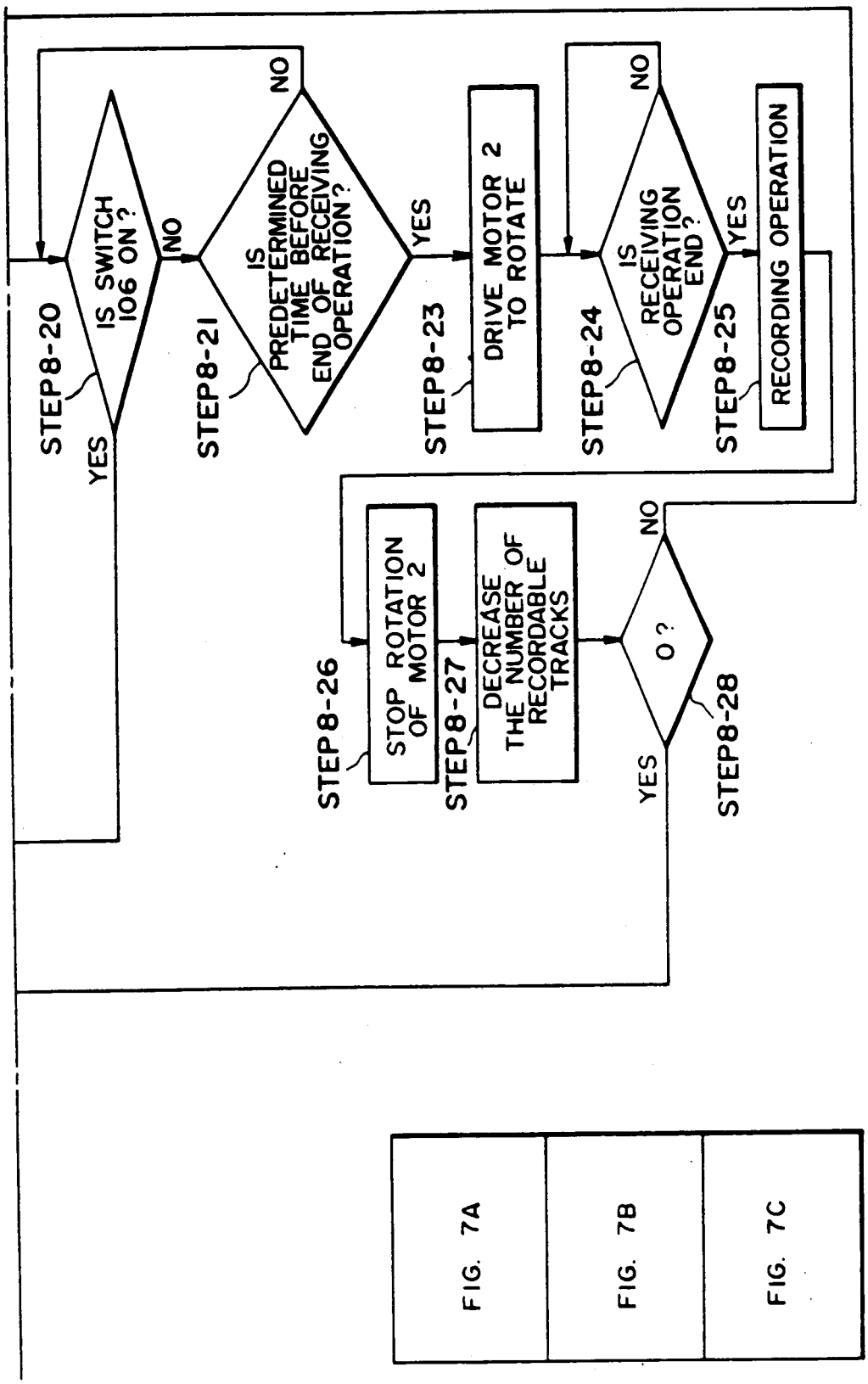

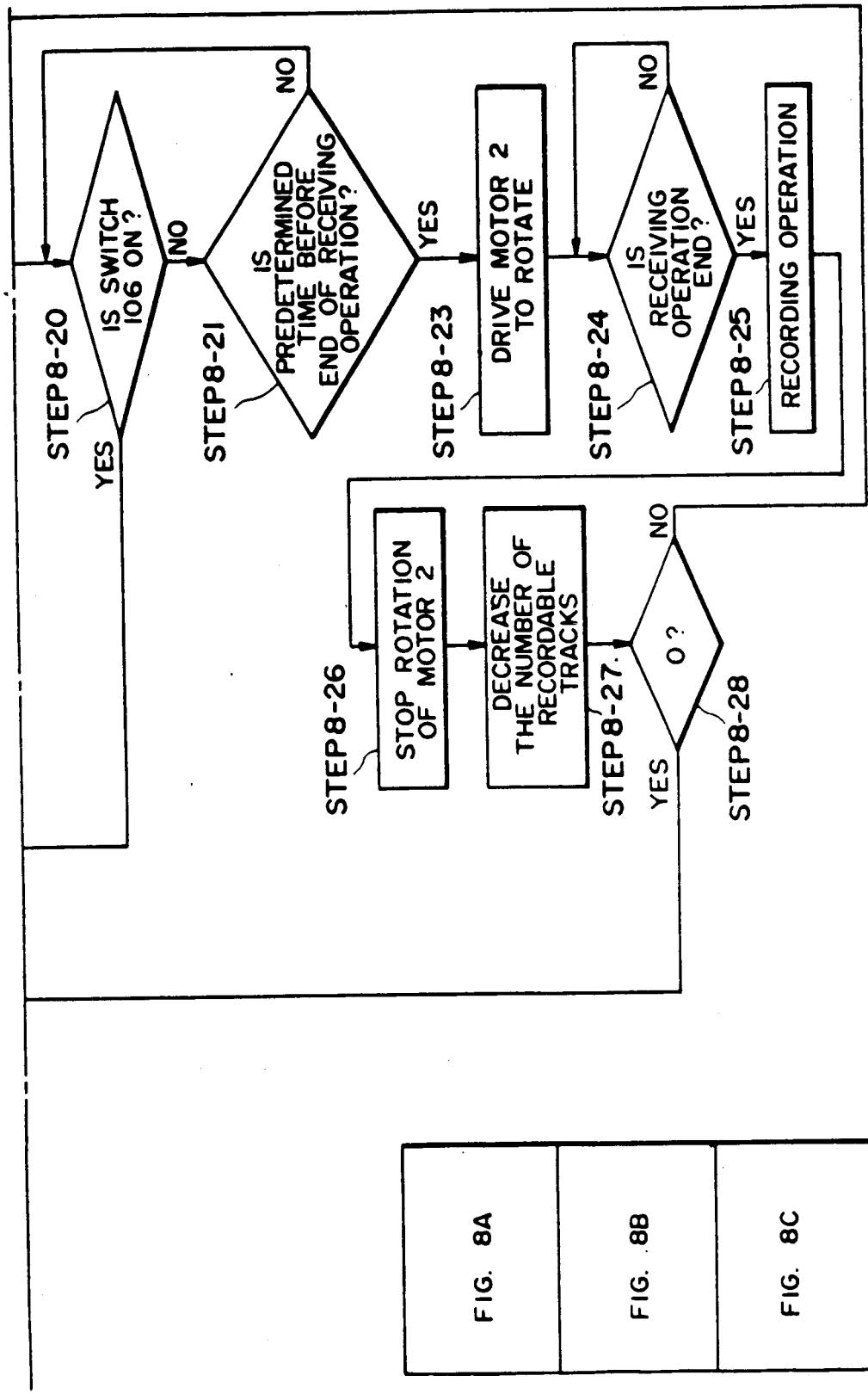

RECEIVING METHOD AND APPARATUS FOR RECORDING RECEIVED DATA ONTO A RECORDING MEDIUM

This application is a division of application, Ser. No. 07/048,840 filed May 12, 1987, now abandoned.

BACKGROUND OF THE INVENTION

1. Field of the Invention

The present invention relates to a receiving apparatus and, more particularly, to a receiving apparatus for recording the received data onto a recording medium.

2. Related Background Art

Hitherto, for example, a facsimile apparatus has been known as a transmitting and receiving apparatus for recording the received data onto a recording medium such as, e.g., paper or the like.

In such a facsimile apparatus, the paper as a recording medium is fed at a constant speed, thereby enabling the recording head to always access the unrecorded portion of the paper.

On the other hand, for example, there is considered a receiving apparatus for recording the received data at an arbitrary position of a recording medium which can be accessed at random.

However, since such a receiving apparatus records the data at an arbitrary position of the recording medium, if the portion accessed by the recording means is unexpectedly the portion at which the data has already been recorded, the problem occurs that data may be written over previously recorded data.

In the apparatus such as a facsimile apparatus, memory means is provided and the data which has once been received is written on the memory medium and after completion of the writing of this data, it is recorded onto a recording medium.

For example, if a disk-shaped rotary medium is used as a recording medium, the recording medium needs to be set into the recordable state, namely, the rotary medium needs to be rotated at a constant speed. Therefore, there is a problem such that if the recording medium is driven in response to the completion of the storage of data into the memory means, a time lag occurs until the apparatus enters the actually recordable state.

On the other hand, in such a conventional facsimile apparatus, when the paper (as a recording medium onto which the received data is to be recorded) does not exist in the apparatus, a warning indicates that data cannot be received.

However, in the conventional facsimile apparatus, the amount of remaining unrecorded portion of the recording medium is not displayed. Therefore, when a large amount of data is transmitted, there is a problem such that it is impossible to know whether all of the data can be received and recorded or not. This problem occurs in not only the facsimile apparatus but also the receiving apparatus for receiving and recording the data onto the recording medium such as, e.g., the receiving apparatus for receiving and recording still image data onto a recording medium such as a magnetic sheet.

SUMMARY OF THE INVENTION

It is the first object of the present invention to provide a receiving apparatus which can solve each of or all of the foregoing problems.

Another object of the invention is to provide a receiving apparatus in which even when the portion of a recording medium at the access position of the recording means is the portion onto which the data has already been recorded, the received data can still be recorded onto the recording medium.

To accomplish these objects, according to a preferred embodiment of the invention, in a receiving apparatus for recording the received data onto a recording medium by recording means for accessing each portion of the recording medium, there is provided a receiving apparatus comprising: discriminating means for discriminating whether the portion accessed by the recording means is a recorded portion or an unrecorded portion upon reception; and control means for allowing the recording means to access the unrecorded portion on the basis of the result of the discrimination of the discriminating means, wherein upon reception, the recording means is controlled by the control means so as to automatically access the unrecorded portion.

Still another object of the invention is to provide a receiving apparatus which can promptly record the received data onto a recording medium upon completion of the reception of the data.

To accomplish this object, according to a preferred embodiment of the invention, in a receiving apparatus for recording the received data onto a recording medium, there is provided a receiving apparatus comprising: memory means for temporarily storing the received data before it is recorded onto the recording medium; driving means for driving the recording medium; and control means for making the driving means operative only a predetermined period of time before completion of the storage of the data into the memory means, wherein since the recording medium is driven only the predetermined period of time before completion of the storage of the data into the memory means, the data can be immediately recorded onto the recording medium in response to the completion of the storage of the data into the memory means.

Still another object of the invention is to provide a receiving apparatus in which upon reception of data, an amount of data which can be received is displayed so as to be easily known.

To accomplish this object, according to a preferred embodiment of the invention, in a receiving apparatus for recording the received data onto a recording medium, there is provided a receiving apparatus having display means for displaying an amount of the unrecorded portion of a recording medium which can be recorded upon reception of data, wherein the amount of the unrecorded portion of the recording medium which can be recorded is displayed by the display means upon reception of data by the receiving apparatus.

Still another object of the invention is to provide a reproducing apparatus in which the data recorded on a recording medium is read out and converted into an electric signal and displayed as a visual data on a monitor, the data recorded is temporarily stored into memory means such as a semiconductor memory, and thereafter, the data is read out of the memory, means and can be preferably displayed on the monitor.

It and, is still another object of the invention to provide a reproducing apparatus for reproducing the data recorded on a recording medium, where i it is possible to prevent the data from being erroneously rewritten in a memory into which the reproduced data is stored.

To accomplish this object, according to a preferred embodiment of the invention, there is provided a reproducing apparatus comprising reproducing means whose access position on a recording medium changes and which reproduces data recorded on the recording medium; memory means for storing the data reproduced by the reproducing means; and control means having a first mode in which the data reproduced by the reproducing means is written into the memory means in accordance with the changed access position of the reproducing means and the second mode in which the writing of data into the memory means is inhibited even when the access position of the reproducing means was changed, wherein by enabling the switching between the first and second modes, it is prevented that the data stored in the memory means is carelessly rewritten.

The above and other objects and features of the present invention will become apparent from the following detailed description and the appended claims with reference to the accompanying drawings.

BRIEF DESCRIPTION OF THE DRAWINGS

FIGS. 3-6, 7A-7C, and 8A-8C are diagrams showing a detailed flow for each routine shown in FIG. 2.

DETAILED DESCRIPTION OF THE PREFERRED EMBODIMENTS

In an embodiment of the present invention which will be explained hereinafter, an explanation will be given with respect to a transmitting and receiving apparatus which has the function of recording still image data onto concentric tracks formed on a magnetic sheet, and the function of transmitting the still image data recorded on the magnetic sheet, and in which the transmitted still image data can be recorded on the magnetic sheet. However, the invention is not limited to only this apparatus.

An embodiment of the invention will now be explained in detail hereinbelow with reference to the drawings.

Figure 1:
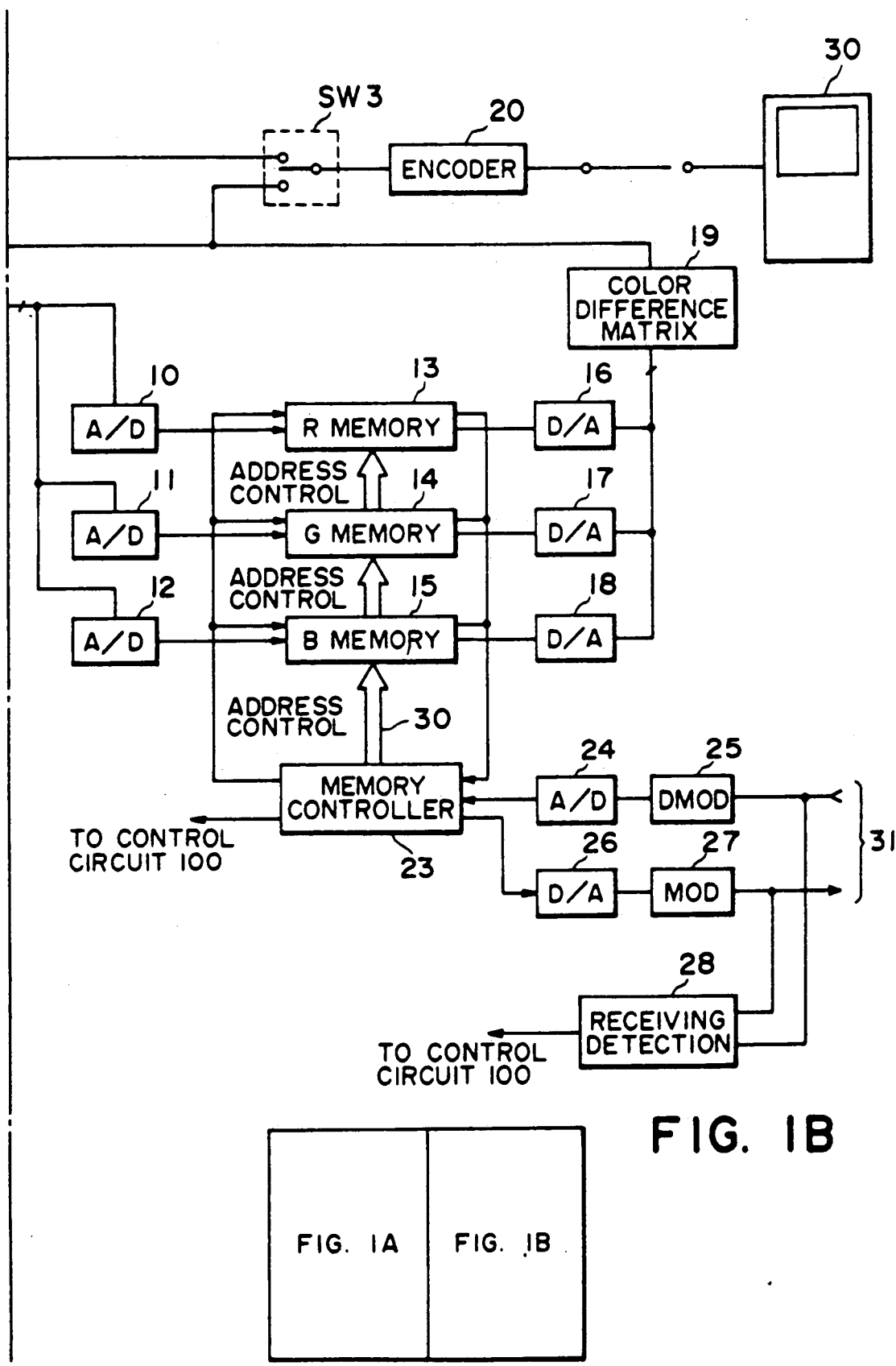
FIG. 1 formed of FIG. 1A and 1B presents a block diagram showing a constitution of a transmitting and receiving apparatus according to an embodiment of the present invention.
Figure 1:
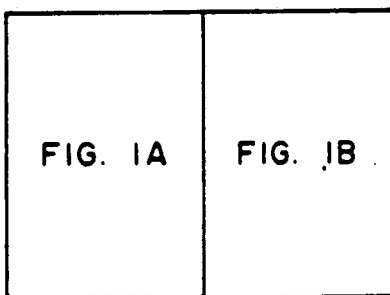
Figure 1A:
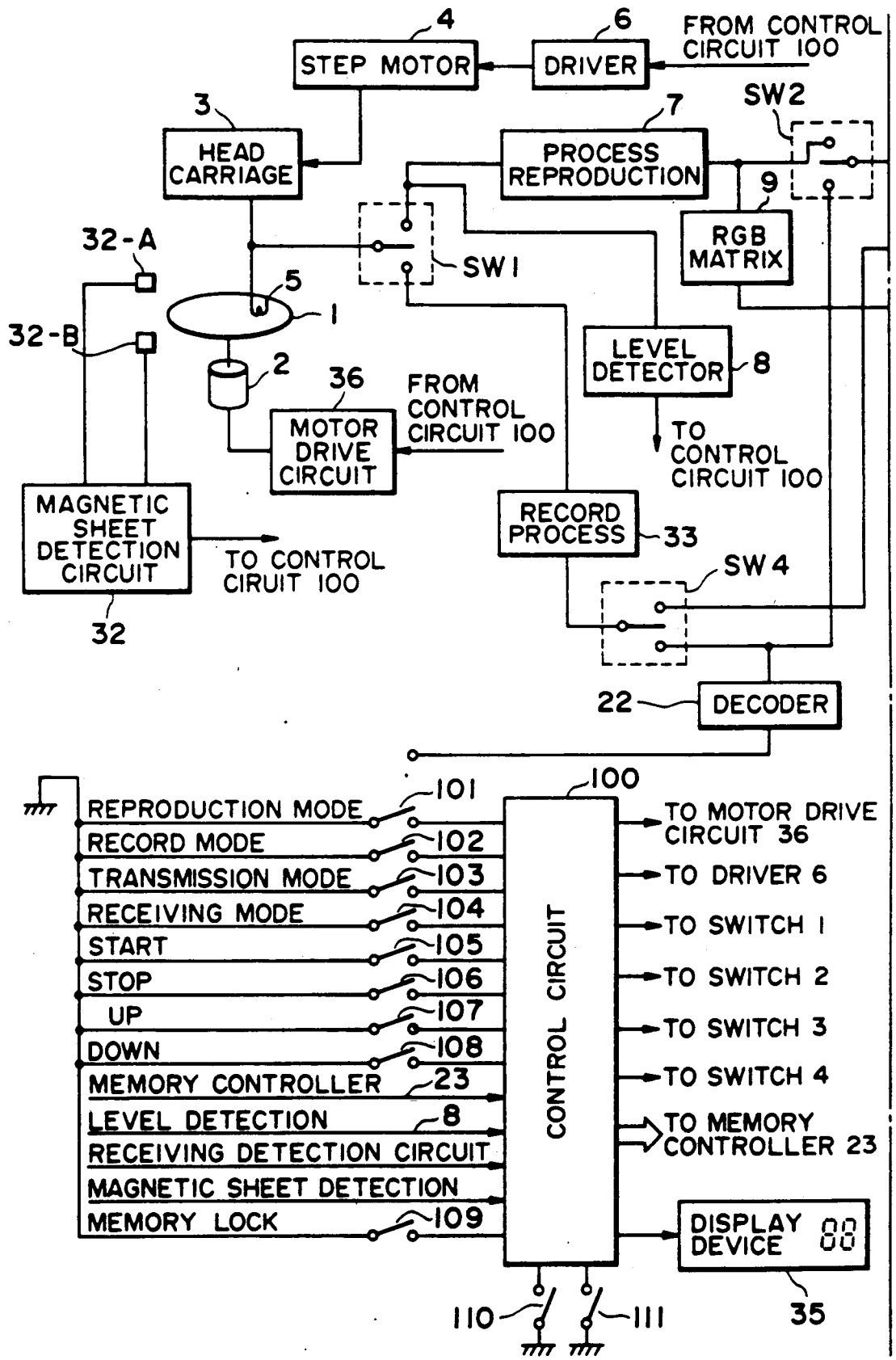

FIG. 1 is a block diagram showing a constitution of the transmitting and receiving apparatus according to an embodiment of the invention.

In FIG. 1, reference numeral 1 denotes a disk-shaped magnetic sheet to or from which data (such as a video signal, an audio signal, or the like) can be recorded or reproduced. Fifty concentric tracks are formed on the magnetic sheet shown in the embodiment. The video signal of one field or the audio signal of a predetermined time is recorded on each track.

A motor 2 rotates the magnetic sheet 1 at a predetermined rotational speed (3600 r.p.m in the case of the NTSC standard) synchronized with the vertical sync signal of the video signal.

A head carriage 3 supports a head 5. By driving the step motor 4, the access position on the magnetic sheet 1 of the head 5 supported by the head carriage 3 can be controlled.

The step motor 4 drives the head carriage 3.

The head 5 is commonly used to record and reproduce data in the embodiment.

A driver 6 outputs a signal to drive the step motor 4 on the basis of a control signal of a control circuit 100. For example, in response to the operations of a track-up switch 107 and a track-down switch 108, which will be explained hereinlater, the control circuit 100 changes the access position on the magnetic sheet 1 of the head 5 or outputs a control signal to the driver 6 when the operation to detect the recording states of the tracks, which will be explained hereinlater, is executed, thereby changing the access position of the head 5.

A reproduction processor 7 performs the processes such as preamplification, clamping, and the like of the reproduction outputs which are reproduced from the tracks on the magnetic sheet 1 by the head 5.

A level detector 8 detects whether output data to be reproduced by the head 5 exists on the track on the magnetic sheet 1 or not. Namely, the level detector 8 detects whether data has already been recorded or not yet recorded on the track which is accessed by the head 5, by use of the following principle. Practically speaking, when a signal has been recorded on the track on the magnetic sheet, the reproduced output level of the head 5 is greater than a predetermined level. When no signal is recorded on the track on the magnetic sheet 1, the reproduced output level of the head 5 is smaller than the predetermined level.

An RGB matrix circuit 9 separates the signal processed by the reproduction processor 7 into the R, G, and B components.

A/D converters 10, 11, and 12 A/D convert the signals of the R, G, and B components separated by the RGB matrix circuit 9.

An R memory, a G memory, and a B memory store the digital signals of the R, G, and B components which were A/D converted by the A/D converters 10, 11, and 12. Each of the R, G, and B memories can store the video signal of one frame.

D/A converters 16, 17, and 18 convert the digital signals stored in the R, G, and B memories 13, 14, and 15 into the analog signals.

A color difference matrix circuit 19 outputs color difference signals R-Y and B-Y and a luminance signal Y from the R, G, and B component signals which were D/A converted by the D/A converters 16, 17, and 18.

An encoder 20 modulates the color difference signals R-Y and B-Y and luminance signal Y which are input through a change-over switch $SW_3$ and then outputs a standard television (TV) signal based on the NTSC standard to a monitor 30.

A decoder 22 receives a standard TV signal of the NTSC standard through an external input terminal 21 and demodulates and outputs the color difference signals R-Y and B-Y and luminance signal Y.

A memory controller 23 controls the writing and reading operations of the R, G, and B memories 13 to 15. The memory controller 23 writes the output of an A/D converter 24, which will be explained hereinafter, into the R, G. and B memories 13 to 15. The memory controller 23 also reads out the signals written in the memories 13 to 15 and outputs to a D/A converter 26.

A modulation signal transmitted through a telephone line 31, (a modulation signal which is divided into the R, G, and B components and which time sequentially transmits every component) is received and demodulated to an analog signal by a demodulator 25. This analog signal is converted into a digital signal by the A/D converter 24.

The demodulator 25 demodulates the modulation signal which is input through the telephone line 31.

The D/A converter 26 converts the digital signals, which were read out of the R, G, and B memories 13 to 15 by the memory controller 23, into analog signals.

A modulator 27 modulates the analog signals converted by the D/A converter 26 and transmits them through the telephone line 31.

The converting rates of the A/D converter 24 and D/A converter 26 are smaller than those of the A/D converters 10 to 12 and D/A converters 16 to 18. Namely, since the A/D converters 10 to 12 and D/A converters 16 to 18 write or read out data into or from the memories 13 to 15 for one field period of the standard television signal, very high converting rates are required On the other hand, since the A/D converter 24 and D/A converter 26 write or read out data into or from the memories 13 to 15 for the period of time of a few minutes through a telephone line having a small band, the converting rates are smaller than those of the A/D converters 10 to 12 and D/A converters 16 to 18.

A receiving detection circuit 28 detects a call signal (corresponding to the call sound of the telephone) which is transmitted prior to transmission of the video signal through the telephone line 31 and outputs a reception command signal.

The monitor 30 reproduces the standard television signal which is input through the telephone line 31.

Numeral 31 denotes the telephone line.

A magnetic sheet detection circuit 32 detects the presence or absence of the magnetic sheet 1 on the basis of signals from photo interruptors 32-A and 32-B.

When the magnetic sheet 1 is present, the optical paths of the photo interruptors 32-A and 32-B are interrupted by the sheet 1. When the magnetic sheet 1 is not present, the optical paths of the photo interruptors 32-A and 32-B are not interrupted. By detecting the difference between the outputs of the photo interruptors, the detection circuit 32 detects the presence or absence of the magnetic sheet and sends the result of the detection to the control circuit 100.

A recording processor 33 modulates the signal which is input through a switch SW$_4$ and sends it to the head 5.

A display device 35 is driven by an output of the control circuit 100 and displays the state in which automatic reception is impossible and also displays the number of remaining recordable tracks in the automatic receiving mode.

A motor drive circuit 36 is made operative or inoperative by an output of the control circuit 100.

A change-over switch SW$_1$ connects the head 5 to the reproduction processor 7 in the reproducing mode. The switch SW$_1$ connects the head 5 to the recording processor 33 in the recording mode.

When the video signal which is input through the external input terminal 21 is output to the monitor 30, a change-over switch SW$_2$ connects the decoder 22 to the switch SW$_3$. When the video signal reproduced from the magnetic sheet 1 is output to the monitor 30, the switch SW$_2$ connects the reproduction processor 7 to the switch SW$_3$.

When the video signal reproduced from the magnetic sheet 1 is directly output to the monitor 30, the change-over switch SW$_3$ connects the switch SW$_2$ to the encoder 20. When the video signals stored in the R, G, and B memories 13 to 15 are output to the monitor 30, the switch SW$_3$ connects the color difference matrix circuit 19 to the encoder 20.

When the video signals stored in the R, G, and B memories 13 to 15 are recorded onto the magnetic sheet 1, the change-over switch SW$_4$ connects the color difference matrix circuit 19 to the recording processor 33. When the video signal which is input through the external input terminal 21 is recorded onto the magnetic sheet 1, the switch SW$_4$ connects the decoder 22 to the recording processor 33.

The connecting states of the switches SW$_1$ to SW$_4$ are switched by the control circuit 100.

The control circuit 100 switches the connecting states of the switches SW$_1$ to SW$_4$ and drives the driver 6 and memory controller 23.

The following switches are connected to the control circuit 100 a reproduction mode setting switch 101 to set the reproduction mode; a recording mode setting switch 102 to set the recording mode; a transmission mode setting switch 103 to set the transmission mode; a receiving mode setting switch 104 to set the receiving mode; a start switch 105 to start the transmission when the transmission mode is set; a stop switch 106 to stop the transmitting operation which was started by pressing the start switch; a track-up switch 107 to shift the access position on the magnetic sheet 1 of the head 5 to the inner peripheral side; a track-down switch 108 to shift the access position on the magnetic sheet 1 of the head 5 to the outer peripheral side: a memory lock switch 109 to inhibit the rewriting of data in the R, G. and B memories 13 to 15; a recording execution switch 110 to execute the recording of data onto the magnetic sheet 1 in the recording mode; and an automatic receiving mode setting switch 111 to set the automatic receiving mode.

The memory lock switch 109 is a bistable type switch having a mode to set the memory lock state and a mode to release the memory lock state. The control circuit 100 also receives the detection output of the magnetic sheet detection circuit 32.

The control circuit 100 has therein a memory to store the recording state of each track on the magnetic sheet 1 which is derived by, e.g., the track recording state detecting operation, which will be explained hereinafter.

The operation of the transmitting and receiving apparatus shown in FIG. 1 will now be described with reference to FIG. 2.

Figure 2:
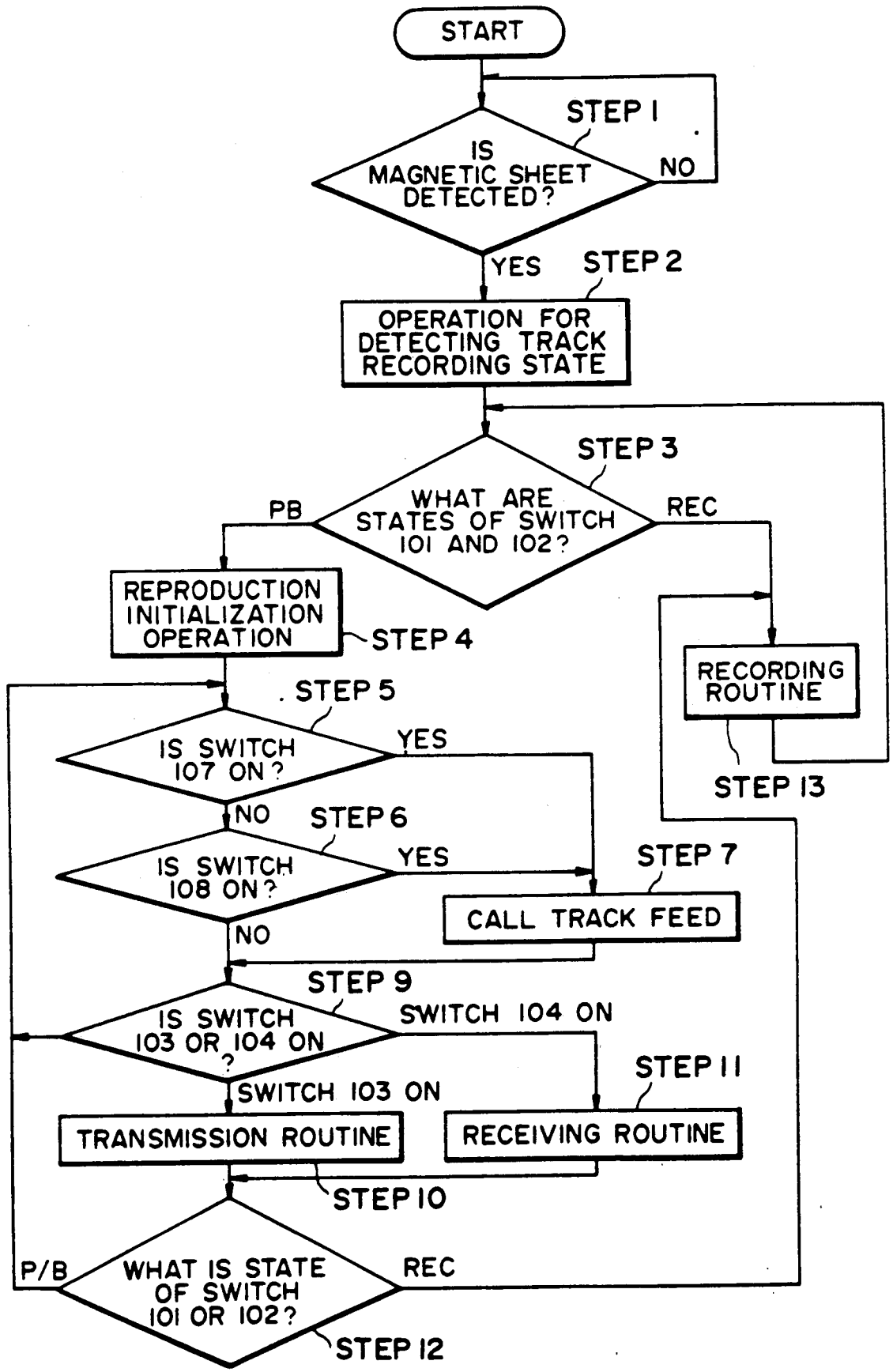
FIG. 2 is a flowchart for explaining the operation of a control circuit 100 shown in FIG. 1.

FIG. 2 is a flowchart for fundamental operation of the transmitting and receiving apparatus shown in in FIG. 1.

When the power source is turned on, a check is made to see if the magnetic sheet 1 is present or not (step 1). If the sheet is present, the track recording state is detected (step 2) in the following manner. For example, the reproducing head is sequentially scanned from the innermost track to the outermost track (or from the outermost track to the innermost track) of the tracks to be recorded on the magnetic sheet 1. The presence or absence of the reproduction signals is detected by the level detector 8, thereby deciding whether the detected track is a recorded track or an unrecorded track. The results of the discrimination are stored. Data indicative of the results of the discrimination may be sequentially corrected in accordance with the recording and erasing operations.

After completion of this correction, the input signals which are supplied to the control circuit 100 from the switches 101 and 102 shown in FIG. 1 are detected to determine whether the operating mode is the reproduction mode or recording mode (step 3).

The reproduction mode will be first explained hereinbelow. In this mode, the processing routine advances to step 4 and the reproduction initializing operation is performed as a pre-stage for reproduction. A detailed flowchart for this step will now be explained with reference to FIG. 3.

Figure 3:
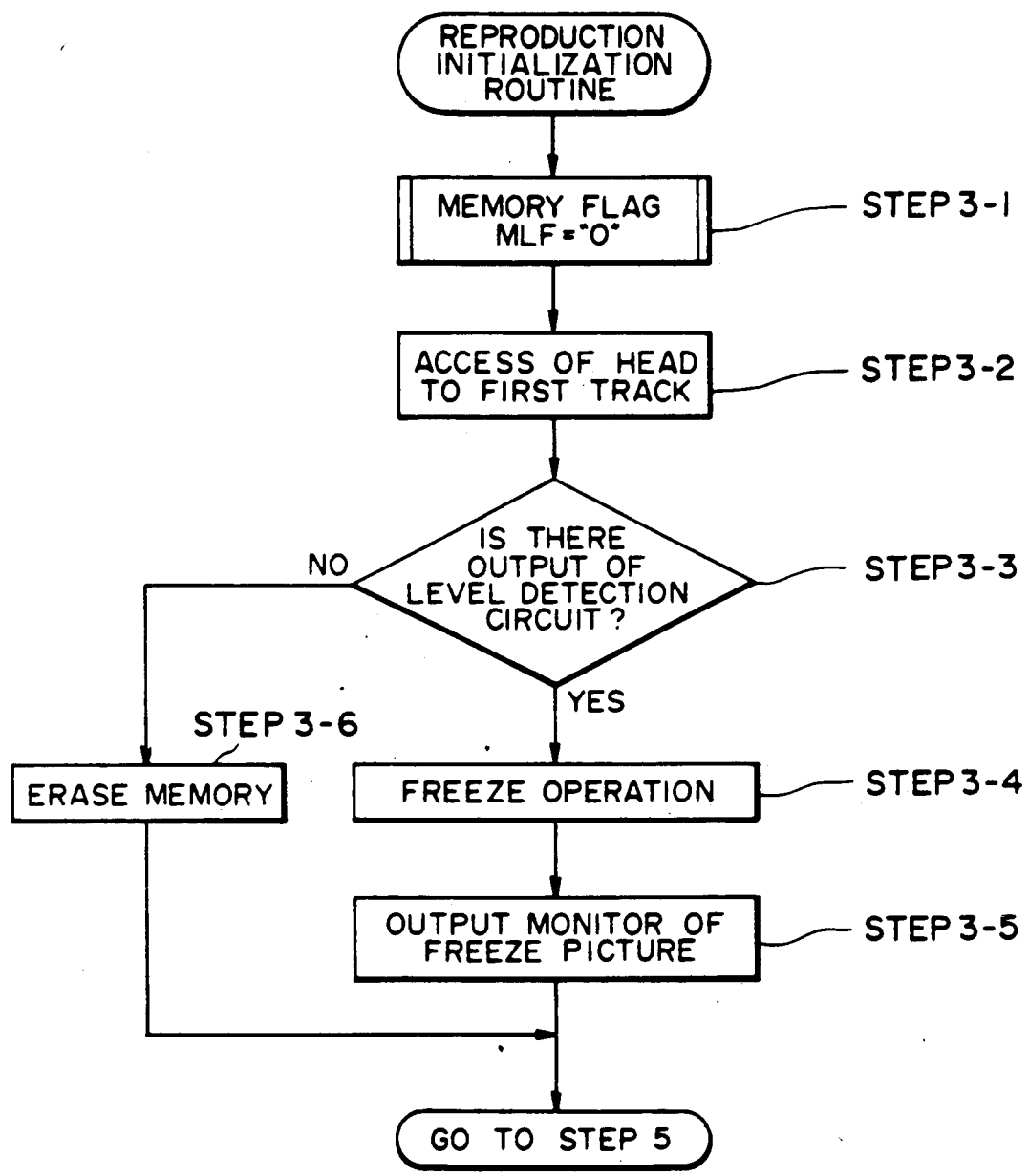

In FIG. 3, a memory lock flag MLF is first reset to release the memory lock state. Thus, the image data reproduced from the magnetic sheet 1 are automatically stored in the memories 13 to 15 (step 3-1). After the flag is reset, the driver 6 is driven such that the reproducing head accesses the first track (outermost track) (step 3-2). When it is detected by the level detector 8 that the first track is a recorded track, a freeze operation is performed, namely, the memory controller 23 is made operative such that the video signal obtained from the track which is being reproduced at present by the head 5 is written in the memories 13 to 15 (step 3-4). After the video signals are written into the memories 13 to 15, the switch $SW_3$ is switched to the memories 13 to 15 from the switch $SW_2$, thereby making the memory controller 23 operative so as to repeatedly read out the signals stored in the memories 13 to 15 (step 3-5).

On the other hand, if it is detected by the level detector 8 in step 3-3 that the first track is an unrecorded track, the memory controller 23 is made operative so as to erase the data in the memories and the video data in the whole picture plane is all rewritten to a black level signal (step 3-6).

After completion of the above operations, the processing routine advances to step 5 in FIG. 2.

Figure 4:
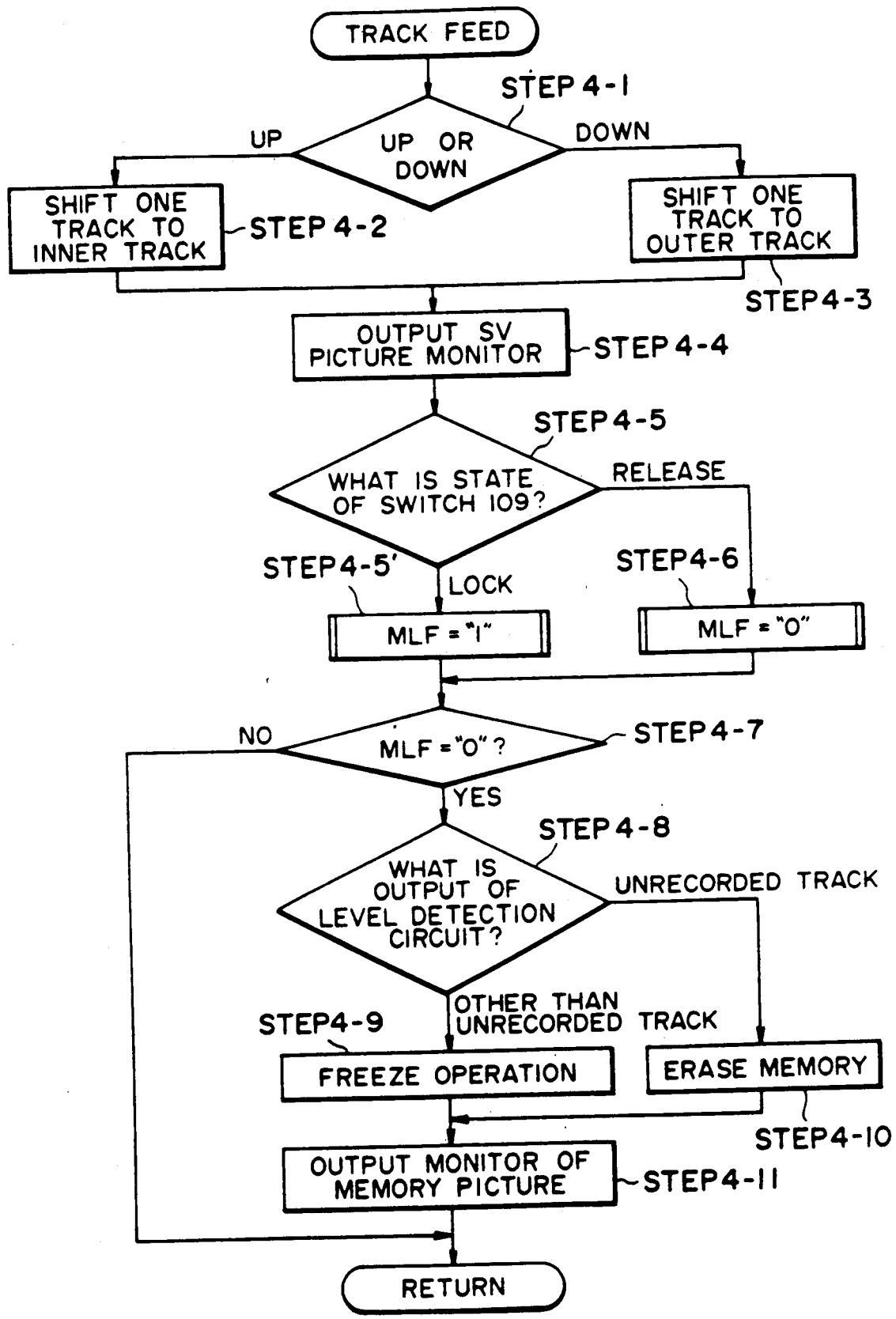

In step 5, a check is made to see if the track-up switch 107 has been turned on or not. If NO, a check is similarly made in step 6 to see if the track-down switch 108 has been turned on or not. If the switches 107 and 108 have been turned on, the sub-routine to feed the track shown, in FIG. 4 is executed.

The track feed subroutine will now be explained with reference to FIG. 4. The head is fed by one track in the direction corresponding to the feeding or returning operation of the track (steps 4-1 to 4-3). In the next step 4-4, the switch $SW_3$ is switched to the switch $SW_2$ from the memories 13 to 15, and the connecting state of the memory lock switch 109 is checked in step 4-5. If the memory lock switch 109 is set to the release state of the memory lock state, the memory lock flag MLF is reset (step 4-6). If the switch 109 is set to the memory lock state, the flag MLF is set to "1" (step 4-5'). Then, step 4-7 follows. In step 4-7, if the flag MLF is set to "1", i.e., in the memory lock state, steps 4-8 to 4-11 are omitted and step 9 follows. If the flag MLF is set to "0", i.e., in the release state of the memory lock state, a check is made by an output of the level detector 8 to see if an output of the shifted head 5 is present or not (step 4-8). In the case of an unrecorded track, similar to the flowchart shown in FIG. 3, the content of the memory is erased (step 4-10). In the case of a recorded track, a freeze operation of the reproduced output of the head 5 is executed (step 4-9). Thereafter, similar to step 3-5, the switch $SW_3$ is switched to make the memory controller 23 operative and the frozen video image is supplied to the monitor 30 (step 4-11).

After completion of the track feed routine of the head, the connecting states of the transmission mode setting switch 103 and receiving mode setting switch 104 are checked (step 9).

If the switch 103 has been turned on and the transmission mode has been set, the transmission routine in step 10 is executed. If the switch 104 has been turned on and the receiving mode has been set, the receiving routine in step 11 is executed. If both switches 103 and 104 have been turned off, step 3 follows.

Therefore, if both switches 103 and 104 have been turned off and either the transmission mode or the receiving mode is not set, the processes in the flow in step 3 and subsequent steps are executed. For example, if the track-up switch 107 and track-down switch 108 have been turned on, the track feed sub-routine is executed in step 7.

Figure 5:
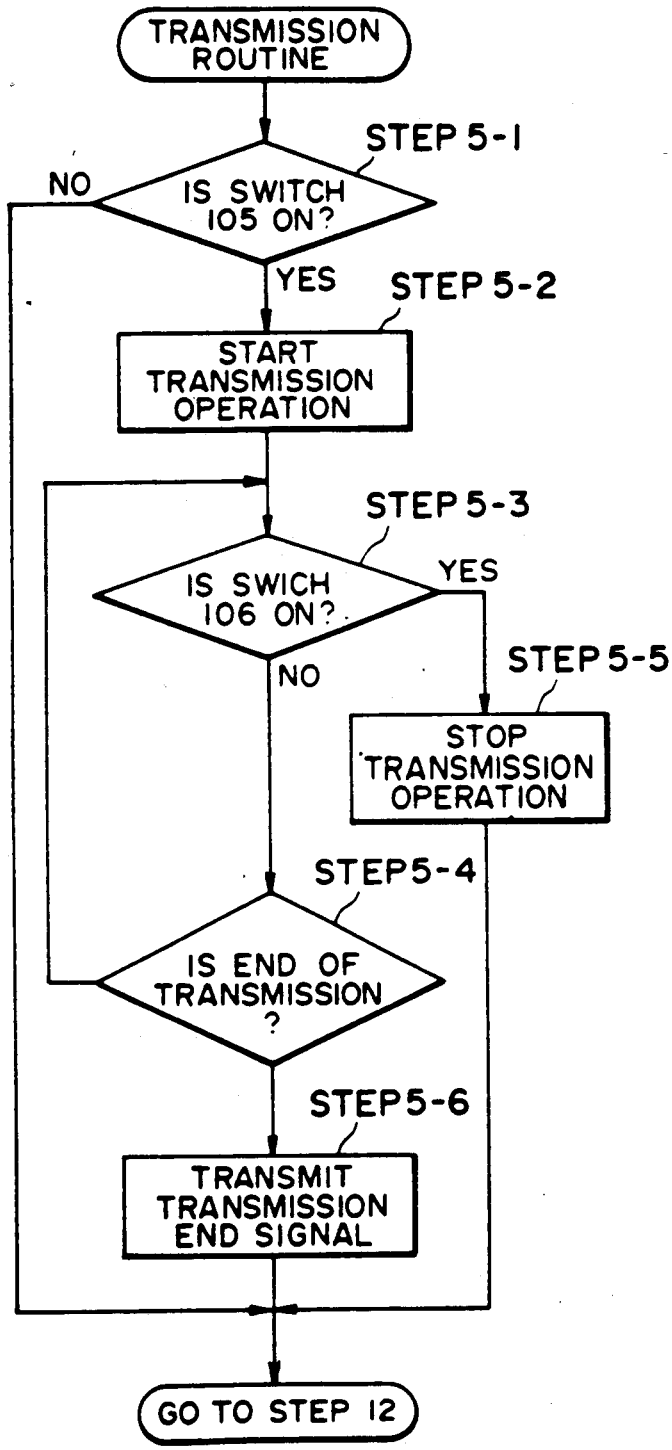

In this case, the transmission routine (which is executed in the case where the switch 103 has been turned on and the transmission mode has been set) will be explained with reference to FIG. 5.

In the transmission routine, a check is first made to see if the start switch 105 has been turned on or not. If YES, step 5-2 follows. If NO, step 12 follows.

Therefore, if the start switch 105 is not turned on even when the transmission mode was set, the processes in the foregoing flow are repeated.

If the start switch 105 was turned on, the memory controller 23 is made operative such that the signals written in the memories 13 to 15 are read out and supplied to the D/A converter 26 at a rate corresponding to the converting rate of the D/A converter 26, i.e., the converting rat corresponding to the band of the telephone line (step 5-2). Next, the loop in steps 5-3 and 5-4 is repeated until the turn-on of the stop switch 106 is detected in step 5-3 or until it is detected in step 5-4 that the transmitting operation has been completed, namely, that all of the signals stored in the memories 13 to 15 have been read out.

When the turn-on of the stop switch 106 is detected, the transmitting operation is stopped, namely, the operations to read out the signals from the memories 3 to 15 and to supply them to the D/A converter 26 are stopped (step 5-5). After completion of the transmitting operation, a transmission end signal is transmitted (step 5-6). Then, the processing routine advances to step 12.

Figure 6:
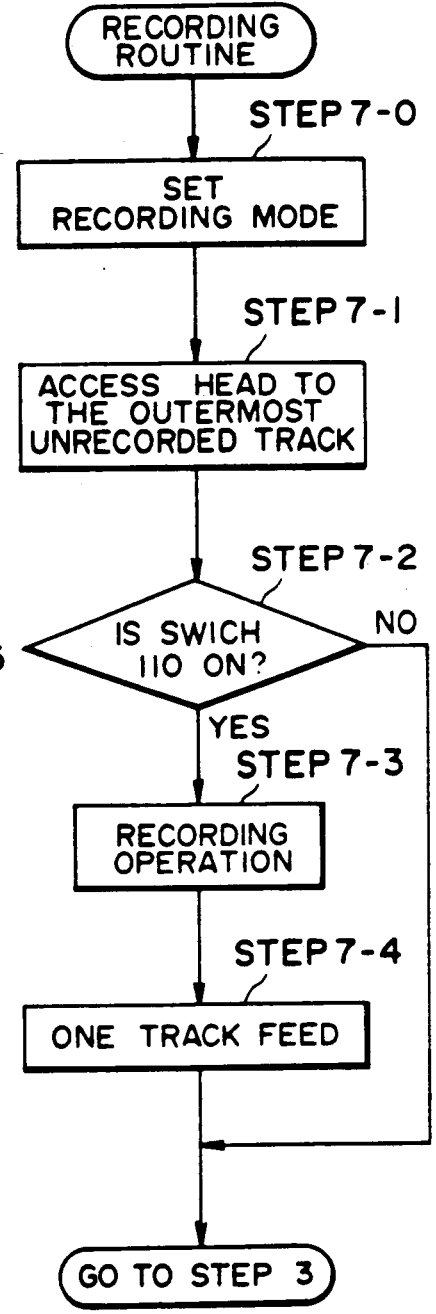

While the above-mentioned routine is being executed, even if the track-up switch 107, track-down switch 108, and the like are turned on, they are not accepted. The recording routine which is executed when the recording mode setting switch 102 has been turned on step 3 will be explained with reference to FIG. 6. FIG. 6 shows a flowchart for such a recording routine.

In the recording routine, the recording mode is first set. Namely, the switch $SW_1$ is switched to connect the head 5 with the recording processor 33. The switch $SW_2$ is switched to connect the decoder 22 with the switch $SW_3$. The switch $SW_3$ is switched to output the signal which is input through the switch $SW_2$ to the encoder 20.

The switch $SW_4$ is also switched to connect the decoder 22 with the recording processor 33 (step 7-0).

When the recording mode is set, the driver 6 is driven in step 7-1 to allow the head 5 to access the outermost track among the unrecorded tracks on the basis of the recording state of the tracks stored in step 2. In this case, the head 5 may also access the outermost track among the continuous unrecorded tracks. After completion of the access in step 7-1, a check is made to see if the recording execution switch 110 has been turned on or not (step 7-2). If NO, step 3 follows. If YES, the video signal of one field or one frame is recorded (step 7-3). The head is fed by one track (step 7-4). In this manner, the recording routine is finished.

After the recording routine shown in step 13 in FIG. 2 is executed as described above, the processing routine is returned to step 3.

The receiving routine shown in step 11 in FIG. 2 will now be explained with reference to FIG. 7.

When it is detected in step 9 that the receiving mode setting switch 104 has been turned on as described above, the receiving routine is executed.

A check is made in step 8-1 to see if the automatic receiving mode has been set or not. If the automatic receiving mode setting switch 111 is not turned on and the operating mode has been set in the standard mode, the processes in step 8-2 and subsequent steps are executed. If the switch 111 has been set and the automatic receiving mode has been set, the processes in step 8-8 and subsequent steps are executed.

In the standard mode, a check is made to see if the start switch 105 (to start reception) has been turned on or not (step 8-2). If not, this routine is finished and the processing routine is returned to step 12. If YES, the receiving operation is started. Namely, the memory controller 23 is made operative such that the signals which are transmitted through the telephone line are written into the memories 13 to 15 (step 8-3). This operation is continued until the turn-on of the stop switch 106 is detected in step 8-4 or the completion of the reception is detected in step 8-5, namely, until it is detected that the transmission end signal which is output when the transmission side had completed the transmission was received.

When the completion of the reception was detected in step 8-5, the memory lock flag MLF is set (step 8-6) and the subsequent freeze operation is stopped. When the turn-on of the stop switch 106 is detected in step 8-4, the processing routine is returned to step 12 shown in FIG. 2 and the connecting states of the reproduction mode setting switch 101 and recording mode setting switch 102 are detected. In the reproduction mode, step 5 follows. In the recording mode, step 13 follows.

The operation when the automatic receiving mode setting switch 111 has been turned on and the automatic receiving mode has been set will now be explained.

In the automatic receiving mode as described above, the processing routine advances from step 8-1 to step 8-8 and the presence or absence of the magnetic sheet is detected by checking the output of the magnetic sheet detection circuit 32. If no magnetic sheet is set, an IRQ flag, which will be explained hereinafter, is set (step 8-13). The display device 35 displays an indication representing that the automatic reception cannot be performed (step 8-14). The processing routine advances to step 12. The foregoing processes are repeated from step 12.

A warning indication by the display device 35 may be performed by audio or light. When the presence of the magnetic sheet 1 is detected in step 8-8, a check is made to see if the IRQ flag has been reset or not (step 8-9).

When the magnetic sheet 1 was taken out in the automatic receiving mode, the processing routine advances from step 8-8 to step 8-13 and the IRQ flag has been set. Therefore, after the magnetic sheet was once taken out in the automatic receiving mode, if another magnetic sheet is set, this means that the IRQ flag has been set. Therefore, the processing routine advances from step 8-9 to step 8-10. The operation to detect the recording state of the tracks shown in step 2 in FIG. 2 is executed (step 8-10). After completion of the detecting operation, the IRQ flag is reset (step 8-11).

When the magnetic sheet 1 is not taken out in the automatic receiving mode and the track recording state detecting operation is performed and the IRQ flag has already been reset, the processing routine advances from step 8-9 to step 8-12.

In step 8-12, a check is made to see if a blank track exists or not by detecting the recording state of the tracks detected in the foregoing detecting operation. If no blank track exists, step 8-14 follows. A warning indicating that the automatic reception cannot be performed is indicated. If a blank track exists, step 8-15 follows. When a blank track is detected, check is made to see if the track which is being accessed at present by the head is the outermost unrecorded track or not. If not, the head is accessed up to the outermost unrecorded track (step 8-16). After completion of the access operation, step 8-17 follows. In this case, the head 5 does not need to always access the outermost unrecorded track but it is sufficient for the head 5 to access any unrecorded track.

In step 8-17, to reduce the electric power consumption and to prevent the track on the magnetic sheet from being damaged by the sliding motion of the magnetic head for a long time, the driving of the motor 2 is temporarily stopped and the number of remaining recordable tracks is obtained on the basis of the recording states of the tracks which were stored due to the track recording state detecting operation, then this number is displayed on the display device 35 (step 8-17). For example, the display device 35 has two digits of LEDs each consisting of seven segments. The number of remaining unrecorded tracks is displayed by the LEDs. For example, when 40 tracks among the 50 tracks on the magnetic sheet 1 are recorded tracks and 10 tracks are unrecorded tracks, "10" is displayed.

In the next step 8-18, the output of the receiving detection circuit is checked. If the reception command signal is detected, step 8-19 follows. If it is not detected, the processing routine is returned to step 12 (in step 8-18). In step 8-19, the receiving operation is started similar to step 8-3. The processes in steps 8-20 and 8-21 are repeated until the stop switch 106 is turned on and the receiving operation is stopped, or until it is detected that, for example, 90% of the signal of one picture plane has been written into the memories 13 to 15, namely, until it is detected that a predetermined time before the reception end state has come.

When the turn-on of the stop switch 106 is detected, the processing routine advances from step 8-20 to step 8-21 and the receiving operation in stopped (step 8-22). The receiving routine is finished and the processing routine is returned to step 12. On the other hand, if it is detected that the predetermined time before the reception end state has come, the processing routine advances from step 8-21 to step 8-23. The motor 2 is driven to rotate the magnetic sheet 1, thereby preparing for the recording operation (step 8-23). The receiving operation is obviously also continued during this interval. It is sufficient to set the foregoing predetermined time to be slightly longer than the time necessary for the completion of the rotation servo after the motor 2 started rotating. In this state, the apparatus waits for the reception end signal, i.e., the transmission end signal (step 8-24). After completion of the reception or transmission, the video signals of one picture plane stored by the receiving operation are read out of the memories 13 to 15 and recorded on the magnetic sheet (step 8-25).

Namely, the memory controller 23 is operated in a manner such that the switch SW₄ is switched to connect the color difference matrix circuit 19 with the recording processor, and the video signals of one picture plane stored in the memories 13 to 15 are output to the D/A converters 16 to 18 by the receiving operation. Thus, the received video image can be confirmed. This embodiment is also characterized by this point.

After completion of the recording, the motor 2 is stopped to immediately stop the rotation of the magnetic sheet 1 (step 8-26). The number of recordable tracks stored in the control circuit 100 is decreased and displayed on the display device 35 (step 8-27). If the number of recordable tracks is 0, step 12 follows and if it is not 0, step 8-15 follows (step 8-28). Therefore, if the recordable track does not exist, the processing routine advances to step 12. When the automatic receiving mode has been set, the processing routine advances from step 9 to step 11 shown in FIG. 2. Practically speaking, after step 8-1 shown in FIG. 7, the processes in steps 8-8 to 8-12 are executed. However, in this state, since no recordable track exists, the processing routine propresses from step 8-12 to step 8-14. A warning representing that the automatic reception cannot be performed is indicated by the display device 35. The execution of the new receiving operation is inhibited (in this case, step 8-19 to start the receiving operation is not executed).

If the recordable track exists, step 8-15 follows and the foregoing operations are repeated.

Figure 7A:
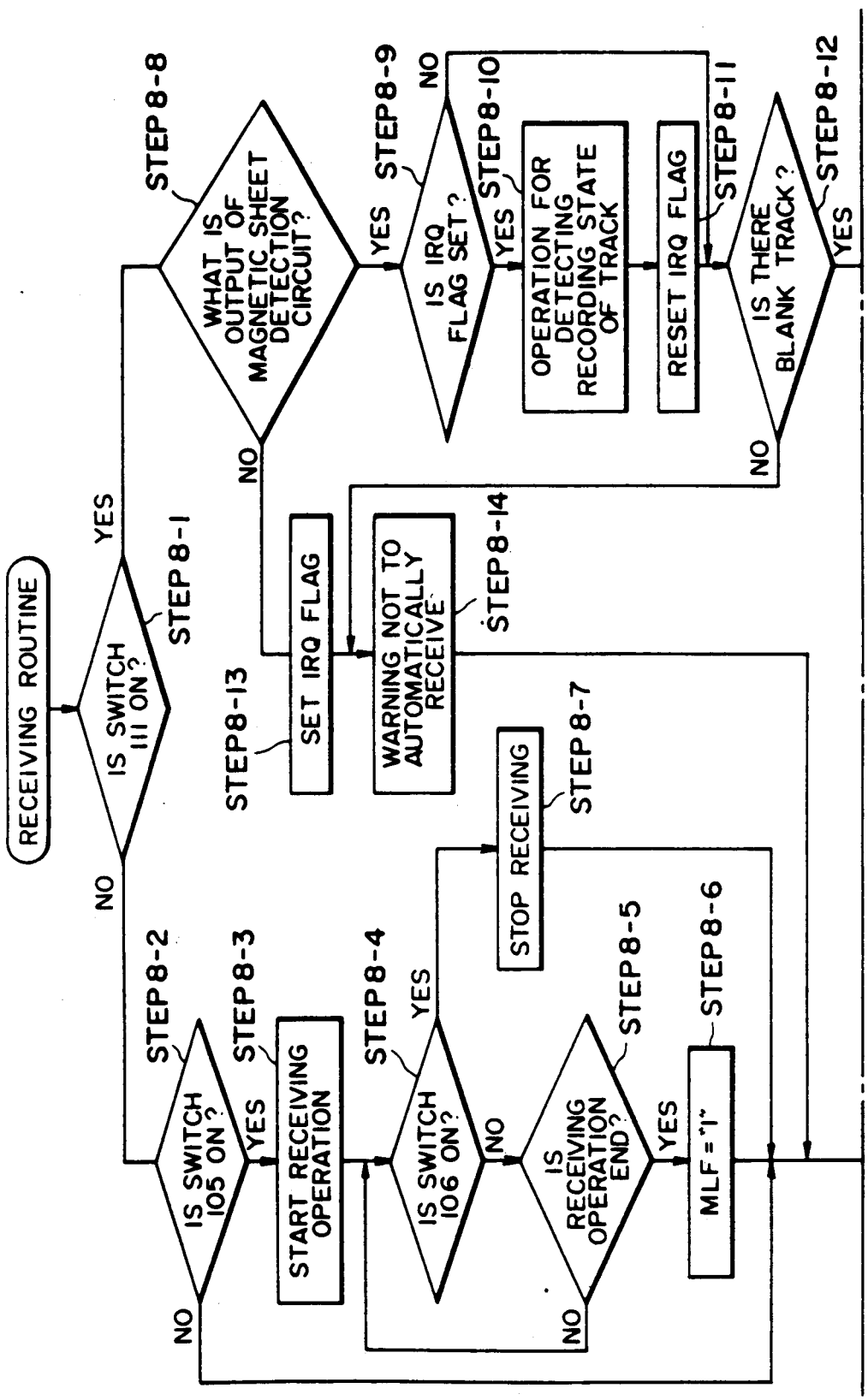
Figure 7B:
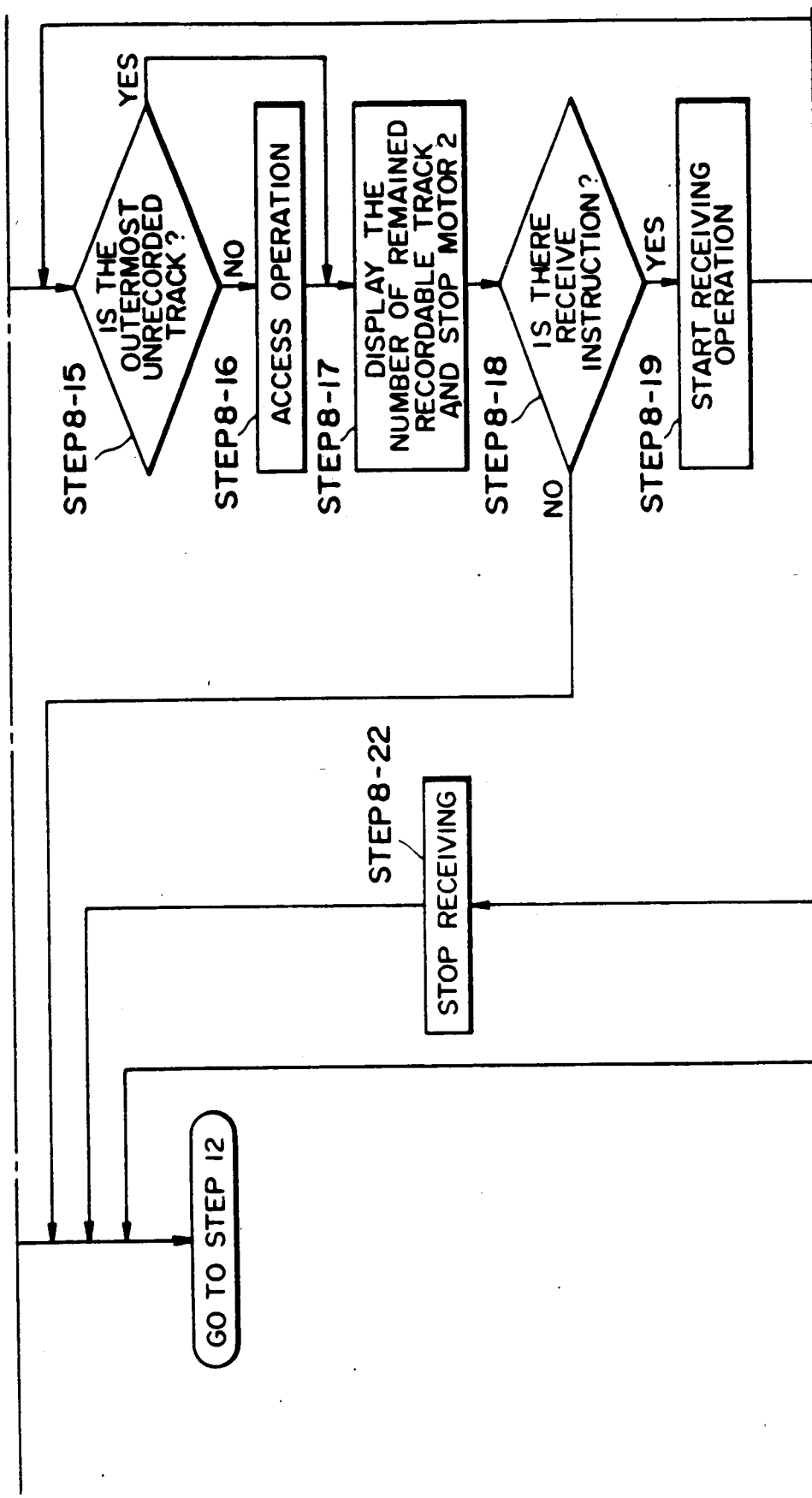

In the flowchart shown in FIG. 7, after the automatic receiving mode has once been set, even if the reception command is not obtained, it is substantially impossible to change the track to be accessed by the head 5 by operating the track-up switch 107 and track-down switch 108. Namely, if the reception command is not obtained after the receiving mode was set, the processes which have previously been described in FIG. 2 are executed from step 12. In steps 5 to 7, the track-up switch 107 and track-down switch 108 are accepted and the freeze operation is performed. The video signals stored in the memories 13 to 15 are reproduced on the monitor. However, by executing step 11 after step 9, namely, by performing steps 8-1 to 8-17 shown in FIG. 7, the head 5 automatically accesses the outermost unrecorded track again, so that the operations of the switches 107 and 108 are remarkably restricted.

Figure 8A:
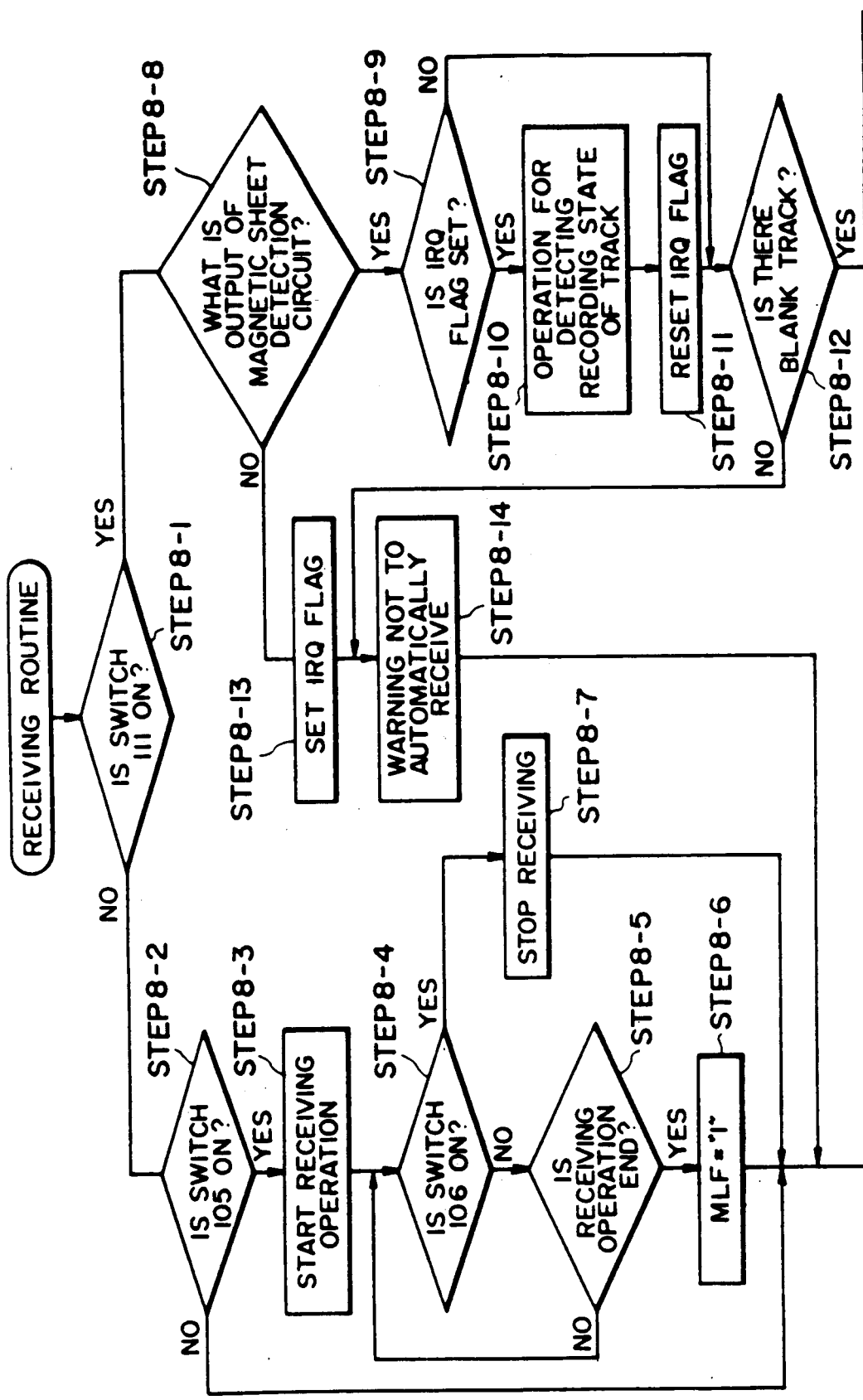
Figure 8B:
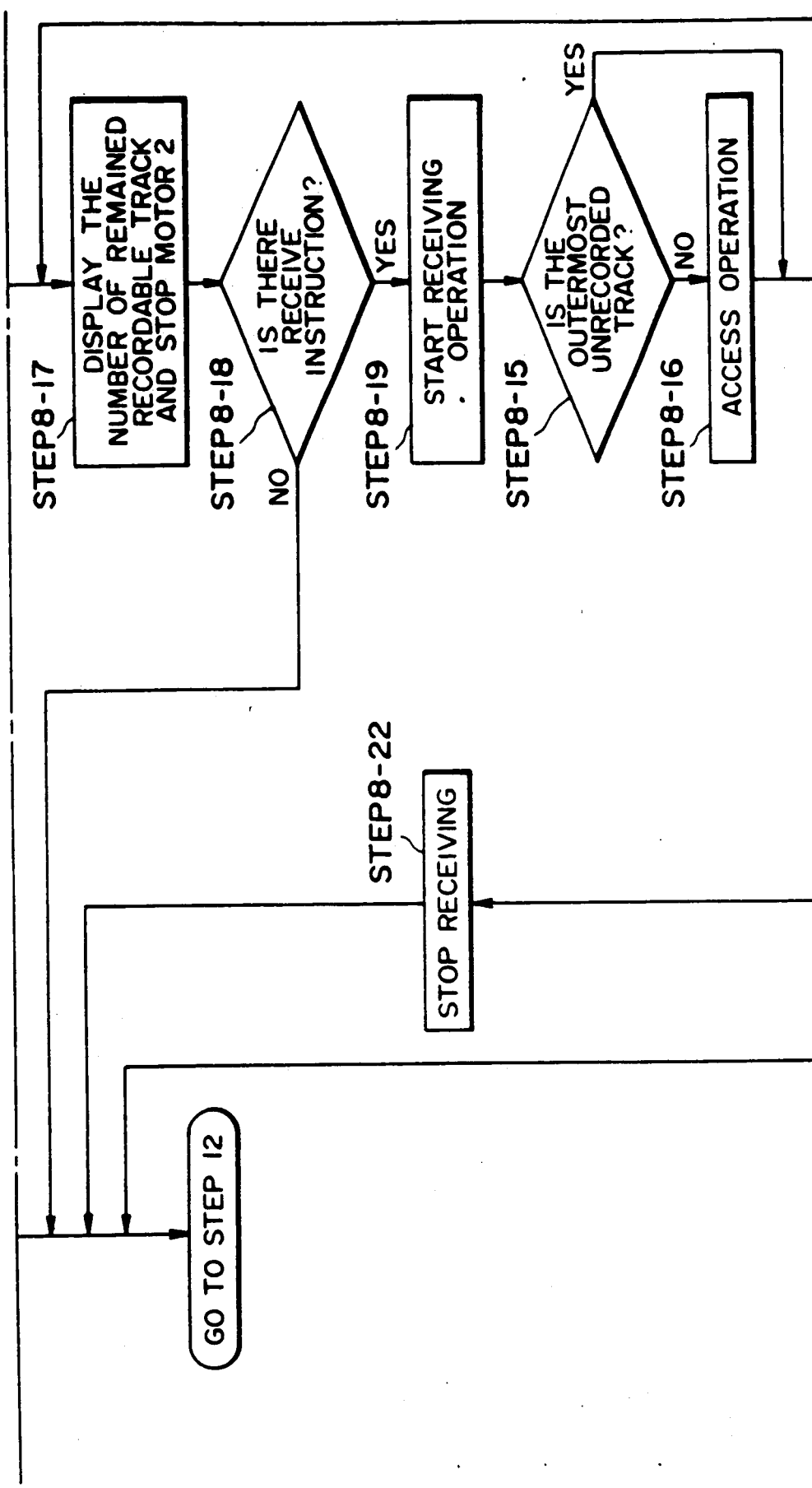

However, as shown in the flowchart of FIG. 8, by exchanging steps 8-15 and 8-16 with steps 8-17 to 8-19, the operations of the switches 107 and 108 can be equalized to the operations in the ordinary reproduction mode until the reception command is obtained.

As described in the above embodiment, since the magnetic sheet 1 is not rotated for the interval when the video data, which is transferred for a long time, is stored into the memories 13 to 15, there are such advantages that abrasion of the sheet 1 and magnetic head 5 can be prevented and electric power consumption can be also reduced.

On the other hand, in the automatic receiving mode, since the automatic reception is performed while continuously accessing the head onto the unrecorded tracks, there is an advantage such that use efficiency is good.

In the foregoing embodiment, the system wherein the recording states of the tracks on the magnetic sheet 1 are always stored has been described. The invention can be also applied to a system which does not always store the recording states of the tracks. In this case, an unrecorded track is sought when the automatic receiving mode is set and if an unrecorded track exists, the recording head stands by on this track. If an unrecorded track does not exist, a warning is given.

In the foregoing embodiment, even if the memory lock state is set by the memory lock switch 109, the contents of the memories 13 to 15 are rewritten for reception in the receiving mode irrespective of the memory lock state. Namely, by setting the receiving mode, the memory enters the same state as that when the memory lock was released.

In the foregoing embodiment, the magnetic recording medium was used as the recording medium. However, an optical recording medium may be also used.

In the foregoing embodiment of the invention, the head 5, in which the position of which changes with respect to the recording medium changes was used as recording means. A discriminating means for discriminating whether the portion accessed by the recording means upon reception is a recorded portion or an unrecorded portion, (step 8-15 in FIG. 7) is provided for detecting and uses of the output of the level detector 8 step 8-16 in FIG. 7. Control means are provided for allowing the recording means to access the unrecorded portion on the basis of the result of the discrimination.

On the other hand, the memories 13 to 15 are provided as memory means for temporarily storing the received data before it is recorded onto the recording medium. The motor 2 and motor drive circuit 36 are provided as driving means for driving the recording medium. The control circuit 100 (to execute steps 8-21 and 8-23 in the flowchart shown in FIG. 7) is provided as control means for making the driving means operative only a predetermined period of time before the completion of the storage of data into the memory means.

In the foregoing embodiment, the display device 35 is provided to display the number of unrecorded tracks in step 8-17 shown in FIG. 7 which is executed when the receiving mode setting switch 104 and the automatic receiving mode setting switch 111 have been turned on.

In the foregoing embodiment, the movable magnetic head 5 has been used as reproducing means. However, another kind of head may be also used. The recording medium may be also moved without moving the head. It is sufficient that the access position changes Although the memories 13 to 15 for storing the video signals of one picture plane have been used as memory means for storing the data reproduced by the reproducing means, their memory capacities are not so limited.

The level detector 8 to detect the output of the reproducing means has been used as discriminating means for discriminating the recording state at the access position of the reproducing means.

The control circuit 100 (to execute steps 4-8 to 4-10 shown in FIG. 4) is provided as control means for controlling the storage state of the memory means on the $ basis of the result of the discrimination of the discriminating means. When the unrecorded state is detected, the contents of the memories 13 to 15 are erased. However, in place of these erasing operations, for example, special patterns or special chrominance signals may be also written into the memories 13 to 15.

As described above, according to this embodiment, for example, when the access position of the reproducing means is in the unrecorded state, it is prevented that the output of the reproducing means is written at the access position in the unrecorded state by the recording means. In this manner, proper control can be performed.

On the other hand, according to the present embodiment, there is such an advantage that immediately after the completion of the reception by the memory means, the data can be recorded onto the recording medium.

On the other hand, according to the embodiment, upon reception, the recordable unrecorded amount of the recording medium is displayed, so that an amount of data which can be received can be preliminarily known.

According to the embodiment, in the reproducing apparatus in which the reproduced video signals are automatically written into the memories 13 to 15 and the video data is read out and reproduced from the memories in the ordinary operating mode, if the data was reproduced from the unrecorded track, the black signal is written into the memory in place of the low level noise signal. Therefore, there are advantages such that the reproduced image can be clearly displayed and the presence or absence of the reproduced signal can be easily discriminated.

On the other hand, there is considered a method whereby the reproduction signal level is detected and the reproduction signal is written as it is into the memory even if the signal level is low and the output of the memory is muted. However, since this method needs a muting circuit, the apparatus of the invention has such an effect that the hardware can be reduced as compared with the above-mentioned muting method.

What is claimed is:

1. A receiving apparatus for recording received data onto a recording medium, comprising:
    memory means for storing the received data before it is recorded onto said recording medium;
    driving means for driving said recording medium; and
    control means for controlling said driving means to actuate said driving means at a predetermined time before the completion of the storing operation of said memory means, wherein the predetermined time is sufficient for said driving means to attain a stable driving state of said recording medium.

2. A receiving apparatus according to claim 1, wherein said recording medium comprises a disc-shaped recording medium.

3. A receiving apparatus according to claim 2, wherein said driving means comprises means for rotating said disc-shaped recording medium.

4. A receiving apparatus according to claim 1, wherein the predetermined time is provided to allow for detection of the stable driving state of said recording medium.

5. A receiving apparatus according to claim 1, further comprising recording means for recording the received data onto said recording medium while the recording medium is being driven by said driving means.

6. A receiving apparatus according to claim 5, wherein said recording medium comprises a magnetic recording medium and said recording means comprises a recording head.

7. A recording apparatus for recording received data onto a recording medium, comprising:
    memory means for storing received data of at least one image before it is recorded onto said recording medium;
    recording means for recording the received data stored in said memory means, onto said recording medium; and
    control means for controlling said recording means to actuate said recording means at a predetermined time before the completion of the storing operation of said memory means, wherein the predetermined time is sufficient to allow said recording means to attain a stable recording state.

8. A recording apparatus according to claim 7, wherein said recording medium comprises a disc-shaped recording medium.

9. A recording apparatus according to claim 8, wherein said recording means comprises:
    driving means for driving said disc-shaped recording medium; and
    a recording head for recording the received data stored in said storing means onto said disc-shaped recording medium.

10. A recording apparatus according to claim 9, wherein the predetermined time is long enough for said driving means to attain a stable driving state.

11. A recording apparatus according to claim 9, wherein said control means causes said recording means to be operative by causing said driving means to operate.

12. A method of recording received data onto a recording medium, comprising the steps of:
    storing the received data into memory means before the received data is recorded onto the recording medium;
    driving the recording medium by driving means; and
    controlling said driving step to actuate the driving means at a predetermined time before the completion of said storing step, wherein the predetermined time is sufficient to allow the driving means to attain a stable driving state.

13. A method according to claim 12, wherein the recording medium is a disc-shaped recording medium.

14. A method according to claim 13, wherein said driving step comprises rotating the disc-shaped recording medium.

15. A method according to claim 12, further comprising providing the predetermined time to detect the stable driving state of the driving means.

16. A method according to claim 12, further comprising recording the received data onto the recording medium while the recording medium is being driven by said driving means in said driving step.

17. A method according to claim 16, wherein the recording medium is a magnetic recording medium, and said recording step is performed by using a recording head.

18. A method of recording received data onto a recording medium, comprising the steps of:
    storing received data of at least one image in memory means before the received data is recorded onto the recording medium;
    recording the received data stored in the memory means, onto the recording medium; and
    controlling the recording of the received data in said recording step to actuate said recording step at a predetermined time before the completion of said storing step, wherein the predetermined time is sufficient to allow said recording step to attain a stable recording state.

19. A method according to claim 18, wherein the recording medium is a disc-shaped recording medium.

20. A method according to claim 19, wherein said recording step comprises:

driving the disc-shaped recording medium; and recording the received data stored in the memory means onto the disc-shaped recording medium by using a recording head.

21. A method according to claim 20, wherein the predetermined time is long enough for said driving step to attain a stable driving state.

22. A method according to claim 20, wherein said controlling step comprises actuating said recording step by said driving step.

* * * * *

UNITED STATES PATENT AND TRADEMARK OFFICE
CERTIFICATE OF CORRECTION

PATENT NO. : 5,053,896

DATED : October 1, 1991

INVENTOR(S) : Tsuguhide SAKATA, et al.

It is certified that error appears in the above-identified patent and that said Letters Patent is hereby corrected as shown below:

COLUMN 2:
    Line 62, "memory, means" should read --memory means--.
    Line 64, "and," should be deleted.
    Line 66, "where i" should read --wherein--.

COLUMN 4:
    Line 65, "and demodu-" should read --and then demodu- --.

COLUMN 5:
    Line 16, "require" should read --required.--.

COLUMN 6:
    Line 17, "circuit 100" should read --circuit 100:--.
    Line 29, "side:" should read --side;--.
    Line 30, "G." should read --G,--.

COLUMN 8:
    Line 31, "converting rat" should read --converting rate--.

COLUMN 12:
    Line 62, "$" should be deleted.

Signed and Sealed this

Fifth Day of May, 1992

*Attest:*

DOUGLAS B. COMER

*Attesting Officer*    *Acting Commissioner of Patents and Trademarks*